Sept. 5, 1933.  T. D. BARNES  1,925,859

WATTHOUR METER

Filed March 18, 1932

WITNESSES:
R. J. Fitzgerald
F. H. Miller

Direction of Torque on disk caused by pole flux unbalance.

INVENTOR
Thomas D. Barnes.
BY
ATTORNEY

Patented Sept. 5, 1933

1,925,859

UNITED STATES PATENT OFFICE 1,925,859

WATTHOUR METER

Thomas D. Barnes, Newark, N. J., assignor to Westinghouse Electric & Manufacturing Company, a corporation of Pennsylvania Application March 18, 1932. Serial No. 599,657

2 Claims. (Cl. 171—264)

My invention relates to meters and like devices that are operated on the induction-motor principle, and particularly to integrating meters of the watthour type.

One object of my invention is to improve the overload characteristics of an intrument, such as an induction-disk bi-polar meter, by providing the same with substantially linear speed-torque relation between the elements thereof at such loads.

Another object of my invention is to provide a compensating torque for an instrument of the above-indicated character that shall tend to correct the reduction in the speed-torque characteristic thereof under overload conditions.

Another object of my invention is to obtain the above-indicated results without materially altering the appearance, size or construction of a usual instument not embodying the improvement.

A further object of my invention is to provide a meter that shall be simple and durable in construction, economical to manufacture and effective in its operation.

In the watthour meter of a usual type, error in the movement of the movable element, or armature, thereof occurs under overload conditions by an inherent increment of damping torque produced by the increased interaction of current flux with the currents induced thereby within the disk, with resultant disproportion of driving and damping torques.

The series poles, being on core legs of corresponding cross-sectional area and material, and produced by a voltage on coils of equal length and cross-sectional area, operate identically in the ordinary meter and are therefore limited to a certain useful operating range by the current-carrying capacity of the coils and the permeability of the legs. Their function is to provide current-component fluxes which are arranged in phase-displaced relation to the voltage flux to move the armature.

I propose to reproportion the fluxes of the series poles and to so place them relative to each other as to overcome the above-mentioned disadvantage, and to extend the useful overload range of such an instrument.

Accordingly, in practicing my invention, instead of having the series fluxes equal and the series coils connected in series relation to each other, in which case the series fluxes and the relative positions of the coils have no differential effect on the operation of the instrument, I connect the coils in parallel circuit relation, to each other, in the series circuit of the instrument, and adjust the relative resistance values of the branches of the parallel circuit to provide a differential effect between these branches. The result is to compensate for the self current damping effect of an ordinary meter and to extend the linear-speed torque values under the higher loads.

Figure 1:
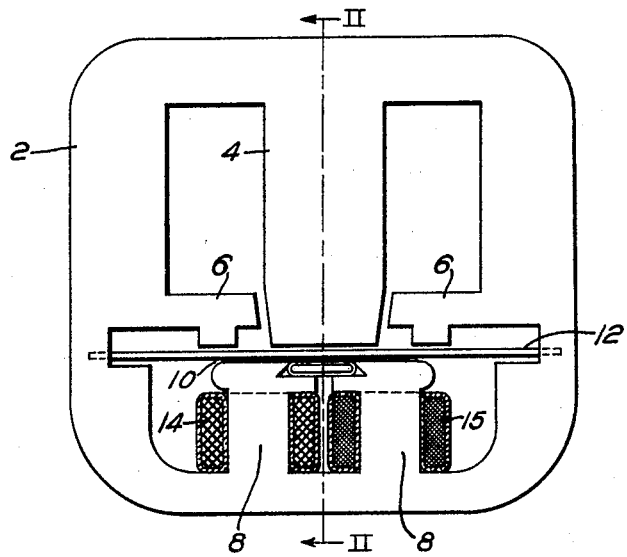
Figure 1 is a side view, partially in elevation and partially in section, of portions of the electromagnet and the armature of a meter embodying my invention.
Figure 2:
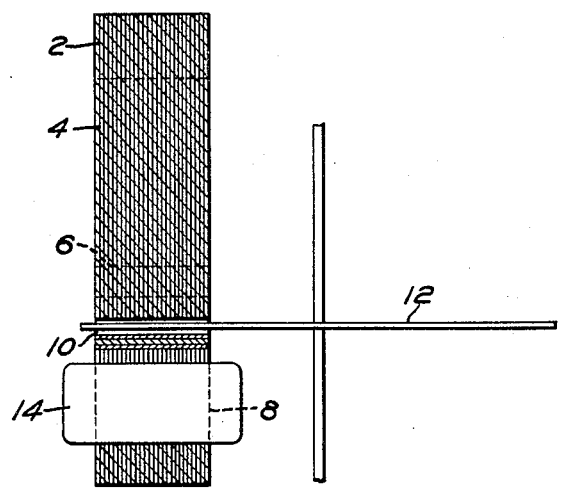
Fig. 2 is a sectional view taken along the line II—II of Fig. 1.

Referring to Figs. 1 and 2, in which only parts of a meter necessary to an understanding of my invention are shown, an electromagnet core 2, of a watthour meter or relay, is constructed of soft-iron sheets or laminations, each in the form of a loop, from the perimeter of which a shunt-pole leg 4, side legs 6 and series legs 8 inwardly project to provide a gap 10 in which a disk armature 12 is disposed.

In a usual watthour meter, the disk 12 is caused to rotate by reaction of currents induced therein with fluxes produced in the legs 4 and 8 in proportion to the volts and the amperes, respectively of a circuit, whereby the disc rotates in accordance with watts.

Also, in a usual meter of this character, the series legs 8 are of corresponding cross-sectional area and material, and are surrounded by duplicate coils in series-circuit relation to each other and to the load circuit of the meter.

In the device of my invention, the core member 2 is retained as heretofore, with the series legs 8 of corresponding material and cross-sectional area and the other parts as in a usual standard meter.

However, instead of having duplicate series coils on the legs 8, I provide coils 14 and 15 of different resistance values on these legs. The coils 14 and 15 also, instead of being connected in series relation to each other, are connected in parallel relation in the series circuit of the instrument. Other means, such as having the coils 14 and 15 duplicates and providing an external resistor in the parallel branch of one of them, or by changing the cross-sectional area or reluctance of one of the legs 8, could, of course be provided but I prefer the embodiment of the invention shown, because of its economical application and its freedom from inaccuracies incidental to other methods.

The purpose of the arrangement is to provide a compensating torque which tends to correct the inherent reduction of the speed torque or load curve at overloads. This effect is produced by weakening the one series pole flux, on the side toward which the disc rotates, relative to the other series pole flux.

Figure 3:
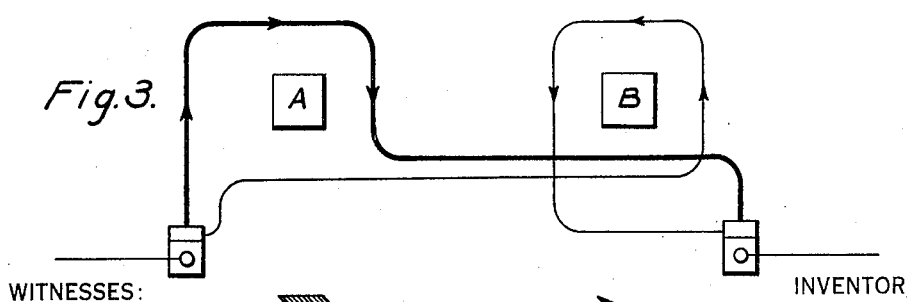
Fig. 3 is a diagram showing the circuits, relative position of parts and direction of forces of the device of Figs. 1 and 2.

As shown in Fig. 3, considering that the disc rotates from left to right, pole B has less flux than pole A, thus producing a compensating torque from left to right.

By the arrangement of the coils 14 and 15, the current thereof may be proportioned to any desired degree.

While I have shown and described particular forms of my invention, changes may be effected therein without departing from the spirit and scope thereof, as set forth in the appended claims.

I claim as my invention:

1. In combination, in an instrument of the watthour-meter type, a movable armature, and means for electro-magnetically moving the same in one direction including a winding responsive to one component of a quantity of a circuit and a plurality of coils traversed by currents of different values providing flux poles of successively lesser densities in said direction, said coils being connected in parallel relation to each other and responsive to another component of said quantity.

2. In combination, in an instrument of the watthour-meter type, a movable armature, and means for electro-magnetically moving the same in one direction including a winding responsive to one component of a quantity of a circuit and a pair of coils of different resistance values connected in parallel relation to each other and responsive to another component of said quantity, the coil of greater resistance being at the far side of the other in said direction.

THOMAS D. BARNES.